July 14, 1931.  J. E. LEDERMAN  1,814,836
SHAFT COUPLING
Filed July 9, 1928
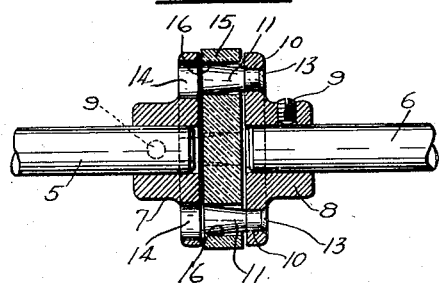
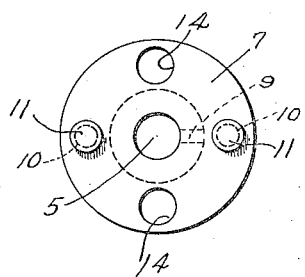 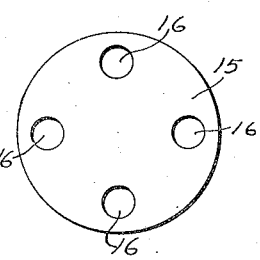 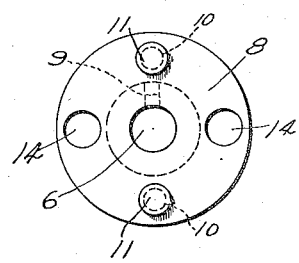
INVENTOR.
John E. Lederman
BY
Quarles & French
ATTORNEYS Patented July 14, 1931 1,814,836

UNITED STATES PATENT OFFICE

JOHN E. LEDERMAN, OF MILWAUKEE, WISCONSIN, ASSIGNOR TO HYDRO ELECTRIC MANUFACTURING COMPANY, OF MILWAUKEE, WISCONSIN, A CORPORATION OF WISCONSIN

SHAFT COUPLING

Application filed July 9, 1928. Serial No. 291,198.

The invention relates to shaft couplings.

There are many instances in the present use of small electric motors for driving household appliances of various kinds where it is highly desirable to prevent stray current from the motor reaching the appliance and causing disagreeable shocks to the person operating it. The object of the present invention is to provide a shaft-drive coupling in which the shafts are driven through a disk of insulated material and in which provision is made for slight inaccuracies of alinement of the shafts.

The invention further consists in the several features hereinafter set forth and more particularly defined by claims at the conclusion hereof.

In the drawings Fig. 1 is a vertical sectional view through a coupling embodying the invention;

Fig. 2 is a front elevation view of one of the flanges;

Fig. 3 is a front elevation view of the insulating disk;

Fig. 4 is a front elevation view of the other coupling flange;

Fig. 5 is a detail side elevation view of one of the coupling pins.

Referring to the drawings, the numerals 5 and 6 designate the shafts to be coupled together in driving relation, the shaft 5 having a disk or flange member 7 secured thereto, the shaft 6 having a similar disk or flange member 8 secured thereto. These flange members may be secured to their respective shafts in any suitable manner and by way of illustration I have shown a set-screw 9 for this purpose, though they may be keyed or otherwise secured if desired. Each of these flange members is provided with a set of diametrically disposed openings 10 in which the shanks of coupling pins 11 are secured and the ends 13 of said pins may be peened over said openings. These parts are of metal and each of said flange members is provided with diametrically disposed pin clearance holes 14 of relatively large diameter to prevent contact of the pins of one flange with the metal of the other flange and to prevent arcing across.

A disk 15 of insulating material is provided with sets of diametrically disposed openings 16 alined with the pins of the flange members or disks 7 and 8. As it is practically impossible to obtain absolute alinement between the shafts and the disks and as a certain amount of flexibility is desired, the pins and the sides of the openings have nonparallel engagement and for this purpose the pins are tapered outwardly where they project into the disk 15 and the holes or openings 16 are substantially straight so that pins will not bind in the openings of the disks but will present sufficient bearing contact between them and the disk to insure an efficient driving connection.

Either one of the shafts may be the drive shaft and the driving torque is transmitted by the pins associated with the drive shaft through the disk 15 to the pins associated with the other shaft and thence to said shaft.

I desire it to be understood that this invention is not to be limited to any particular form or arrangement of parts except insofar as such limitations are specified in the claims.

What I claim as my invention is:

1. In a shaft-drive coupling, the combination with a pair of shafts, of a disk of insulating material interposed between the shafts and provided with coupling-pin-receiving openings, and tapered coupling pins associated with each of said shafts and having substantially line contact engagement with the walls of said openings.

2. In a shaft-drive coupling, the combination with a pair of shafts, of a disk of insulating material interposed between the shafts and provided with coupling-pin-receiving openings, a metal coupling flange associated with each of said shafts, metal coupling pins mounted in said flanges and engageable with the walls of said openings, and holes extending through said flanges providing electrical clearance for the free ends of the pins and the adjacent flange.

3. In a shaft-drive coupling, the combination with a pair of shafts, of a disk of insulating material interposed between the shafts and provided with coupling-pin-receiving openings, a metal coupling flange associated with each shaft, and metal coupling pins mounted in said flanges and having outwardly tapered portions projecting into and engageable with the side walls of said openings.

In testimony whereof, I affix my signature.

JOHN E. LEDERMAN.